United States Patent

Corpart et al.

[11] Patent Number: 6,111,043
[45] Date of Patent: Aug. 29, 2000

[54] FLUOROCOPOLYMERS FOR OIL REPELLING AND WATERPROOFING TREATMENT OF VARIOUS SUBSTRATES

[75] Inventors: Jean-Marc Corpart, Sannois; Andre Dessaint, Clermont; Marie-Jose Lina, Lyons, all of France

[73] Assignee: Elf Atochem S.A., France

[21] Appl. No.: 09/308,966

[22] PCT Filed: Nov. 18, 1997

[86] PCT No.: PCT/FR97/02078

§ 371 Date: Aug. 13, 1999

§ 102(e) Date: Aug. 13, 1999

[87] PCT Pub. No.: WO98/23657

PCT Pub. Date: Jun. 4, 1998

[30] Foreign Application Priority Data

Nov. 27, 1996 [FR] France ................................ 96/14546

[51] Int. Cl.[7] .................................................. C08F 114/18
[52] U.S. Cl. ........................... 526/243; 526/245; 526/246; 526/248; 525/326.2; 428/422; 428/532
[58] Field of Search ..................... 526/243, 245, 526/246, 248; 525/326.2; 428/422, 532

[56] References Cited

U.S. PATENT DOCUMENTS 3,271,349 9/1966 Levey.
5,439,998 8/1995 Lina et al..

FOREIGN PATENT DOCUMENTS 542598 5/1993 European Pat. Off..

OTHER PUBLICATIONS

International Search Report dated Mar. 12, 1998.

*Primary Examiner*—Helen L. Pezzuto
*Attorney, Agent, or Firm*—Smith, Gambrell & Russell

[57] ABSTRACT

In order to improve the barrier effect to fats of the cationic fluorinated copolymers of Patent EP 542,598 resulting from the copolymerization of at least one polyfluorinated monomer, of at least one aminoalkyl (meth)acrylate and of at least one vinyl monomer (in particular vinyl acetate), they are subjected to the action of hydrogen peroxide during the salification stage or after the latter.

16 Claims, No Drawings

FLUOROCOPOLYMERS FOR OIL REPELLING AND WATERPROOFING TREATMENT OF VARIOUS SUBSTRATES

FIELD OF THE INVENTION

The subject of the present invention is new fluorinated copolymers and their use in coating and impregnating various substrates, such as textiles, leather, wood, nonwovens, metals, concrete and, more particularly, paper and similar articles, in order to render them oleophobic and hydrophobic. The subject of the present invention is also the substrates which have been so treated.

BACKGROUND OF THE INVENTION

Various products have been provided in the past for this type of treatment. In particular, EP 542,598, the contents of which are incorporated here by way of reference, provided salified or quaternized, fluorinated acrylic copolymers comprising, by weight:

(a) 50 to 92%, preferably 70 to 90%, of one or more polyfluorinated monomers of general formula:

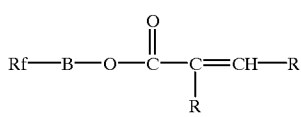

(I)

in which Rf represents a straight- or branched-chain perfluorinated radical containing 2 to 20 carbon atoms, preferably 4 to 16 carbon atoms, B represents a bivalent chain sequence which is bonded to O via a carbon atom and which can contain one or more oxygen, sulphur and/or nitrogen atoms, one of the R symbols represents a hydrogen atom and the other a hydrogen atom or an alkyl radical containing 1 to 4 carbon atoms;

(b) 1 to 25%, preferably 8 to 18%, of one or more monomers of general formula:

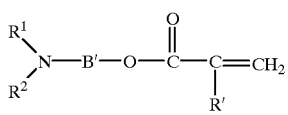

(II)

in which B' represents a linear or branched alkylene radical containing 1 to 4 carbon atoms, R' represents a hydrogen atom or an alkyl radical containing 1 to 4 carbon atoms, the $R^1$ and $R^2$ symbols, which are identical or different, each represent a hydrogen atom, a linear or branched alkyl radical containing 1 to 18 carbon atoms or a hydroxyethyl or benzyl radical, or $R^1$ and $R^2$, together with the nitrogen atom to which they are bonded, form a morpholino, piperidino or 1-pyrrolidinyl radical;

(c) 1 to 25%, preferably 2 to 10%, of a vinyl derivative of general formula:

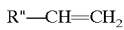

(III)

in which R" can be an alkyl carboxylate or alkyl ether group containing from 1 to 18 carbon atoms;

(d) 0 to 10%, preferably 0 to 8%, of any monomer other than the monomers of formulae I, II and III.

These fluorinated copolyers, which are completely dilutable with water, can be applied on various substrates, such as leather, nonwovens, construction materials, paper and cardboard. In particular, they can be applied on paper according to various techniques (in a size press or in the body of the material), thus conferring excellent hydrophobic and oleophobic properties on the paper, without requiring adjuvants (sequestering agents, retention agents, fixing resins, and the like).

Such types of paper are used in the field of the packaging of wet and/or greasy foodstuffs in markets as varied as the biscuit/Viennese bread and buns sector, the fast-food industry, the margarine and butter market, the meat and poultry market, the field of chocolate or coffee, deep-frozen products or the market for dry food for dogs and cats (pet food).

In the case of animal food, the fluorinated treatment must be capable of providing a barrier to particularly aggressive fats (fatty acid esters), in order to prevent the appearance of stains related to the migration of these fats, in particular into the corners and the folds of the packagings.

In order to obtain an improvement in the barrier effect to fats, it is advantageous to combine the fluorinated acrylic copolymers described in Patent EP 542,598 with a starch or with a polyvinyl alcohol. However, in the case of certain types of paper, the barrier to fats is only obtained after a fairly long maturing time for the paper, by simple storage at room temperature for two to three weeks. The need to have to store the paper before using it to produce packagings, the impossibility of controlling the quality of his production at the outlet of the machine and the need to manage the delivery times to his customers present the paper manufacturer with significant problems.

DESCRIPTION OF THE INVENTION

It has now been found that it is possible to overcome this disadvantage and to obtain the desired performance of the barrier effect to fats after only a few days (less than one week) by modifying the conditions for the synthesis of the copolymers which are described in Patent EP 542,598.

The products of Patent EP 542,598 are prepared by copolymerization of the monomers in solution in a water-miscible organic solvent or in a mixture of such solvents. The reaction mixture is then diluted with water in the presence of an inorganic or organic acid in order to salify the macromolecules.

The preparation of the fluorinated copolymers of the present invention is carried out in the same way but, in addition, during the salification stage or after the latter, the copolymer is subjected to the action of hydrogen peroxide.

The subject of the invention is thus the fluorinated copolymers obtainable by the copolymerization of:

(a) 50 to 92% by weight of at least one polyfluorinated monomer of general formula I, (b) 1 to 25% by weight of at least one monomer of general formula II, (b) 1 to 25% by weight of at least one monomer of general formula II, (c) 1 to 25% by weight of at least one vinyl monomer of general formula III, and (d) 0 to 10% by weight of one or more monomers other than those of formulae I, II and III, the said copolymerization being carried out in a water-miscible organic solvent or mixture of water-miscible organic solvents and being followed by a stage of dilution with an aqueous solution of an inorganic or organic acid, characterized in that the said stage is carried out in the presence of hydrogen peroxide or is followed by a treatment by means of an aqueous hydrogen peroxide solution.

As in Patent EP 542,598, the preferred copolymers are those obtained from 70 to 90% of polyfluorinated monomer (s) of formula I, 8 to 18% of monomer(s) of formula II, 2 to 10% of vinyl monomer(s) of formula III and 0 to 8% of monomer(s) other than those of formulae I, II and III.

Numerous examples of monomers of formulae I, II and III and of optional monomers (d) are mentioned in Patent EP 542,598 (page 3, line 35 to page 5, line 44), to which patent reference may be made. According to the present invention, it is preferable to use:

(a) as polyfluorinated monomers of formula I, the compounds of formula:

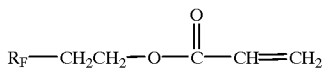

in which $R_F$ is a perfluoroalkyl radical containing 4 to 16 carbon atoms;

(b) dimethylaminoethyl methacrylate or N-tert-butylaminoethyl methacrylate as monomer of formula II; and (c) vinyl acetate as monomer of formula III.

Mention may be made, as non-limiting examples of water-miscible organic solvents in which the copolymerization is carried out, of ketones (acetone or methyl ethyl ketone, for example), alcohols (isopropanol, for example), ethers (the methyl or ethyl ether of ethylene glycol or of propylene glycol and their acetates, tetrahydrofuran and dioxane, for example), dimethylformamide, N-methyl-2-pyrrolidone, butyrolactone and dimethyl sulphoxide. For the implementation of the invention, it is preferable to use N-methyl-2-pyrrolidone (NMP) or a mixture of the latter with acetone as solvent. The total concentration of the monomers in the organic solvent or mixture of organic solvents can range from 20 to 70% by weight and is preferably between 40 and 60%.

The copolymerization is carried out in the presence of at least one initiator, used in the proportion of 0.1 to 1.5% with respect to the total weight of monomers. Use may be made, as initiators, of peroxides, such as benzoyl peroxide, lauroyl peroxide, succinyl peroxide and tert-butyl perpivalate, or of azo compounds, such as, for example, 2,2'-azobisisobutyronitrile, 4,4'-azobis(4-cyanopentanoic acid) and azodicarbonamide. The copolymerization stage can be carried out at a temperature ranging from 40° C. to the boiling point of the reaction mixture. The copolymerization stage is preferably carried out between 60 and 90° C.

The dilution stage consists in adding, to the organic solution of the copolymer, an aqueous solution of a strong or moderately strong inorganic or organic acid, that is to say for which the dissociation constant or the first dissociation constant is greater than $10^{-5}$. Mention may be made, as such acids, of for example hydrochloric, hydrobromic, sulphuric, nitric, phosphoric, acetic, formic, propionic or lactic acid but it is preferable to use acetic acid. The amount of aqueous solution to be used and the acid concentration therein have to be sufficient, on the one hand, to completely salify the amine functional groups carried by the monomer(s) of formula II and, on the other hand, to obtain a final copolymer solution having a solids content of between 5 and 30%, preferably between 20 and 30%. For the complete salification of the amine functional groups, the amount of acid is advantageously between 1 and 5 acid equivalents with respect to the monomer(s) of formula II, preferably between 2 and 3 equivalents.

The amount of hydrogen peroxide used is between 0.1 and 10%, preferably 0.3 to 3%, with respect to the total weight of the starting monomers. The treatment is carried out between 25 and 100° C., preferably from 70 to 85° C. If the concentration of hydrogen peroxide used is high (greater than or equal to 3%), the chemical structure of the copolymer is substantially modified. The hydrogen peroxide reacts with the amine functional groups originating from the salified monomer of formula (II), to result in the formation of N-oxide groups along the macromolecules. The cationicity of the copolymer is greatly reduced and the fluorinated product is no longer capable, alone, of being adsorbed onto the anionic cellulose fibres. If it is desired to apply it in the body of the material, it is necessary to combine it with a cationic fixing resin.

When the level of hydrogen peroxide remains sufficiently low, the structure of the fluorinated copolymer is not substantially modified and the conditions for application of the product remain the same as those defined in Patent EP 542,598. Nevertheless, surprisingly and unexpectedly, the performance in resisting the aggressive fats present in pet food is markedly improved.

After the treatment of the reaction mixture with an aqueous hydrogen peroxide solution, distillation under vacuum or stripping with an inert gas, for example nitrogen, makes it possible to remove the volatile compounds and to obtain a commercial product which no longer has an ignition point between 0 and 100° C. according to ASTM standard D3828. In particular, if the reaction medium is a light solvent, such as acetone, the final product after distillation no longer comprises the organic solvent.

The treatment with hydrogen peroxide according to the present invention greatly facilitates this distillation operation. This is because the hydrogen peroxide mostly reacts with the residual vinyl acetate to give acetaldehyde and acetic acid. The acetaldehyde, the boiling point of which is 19° C., is easily removed from the mixture by distillation or by stripping with an inert gas, for example nitrogen.

The subject of the present invention is also a solid substrate comprising at least a fluorinated copolymer according to the invention, such as previously defined.

Paper, cardboard and related materials have already been freely mentioned as substrates capable of being rendered oleophobic and hydrophobic with the products according to the invention. Mention may also be made of other, highly varied materials, such as, for example, woven or nonwoven articles based on cellulose or on regenerated cellulose or on natural, artificial or synthetic fibres, such as cotton, cellulose acetate, wool, silk or polyamide, polyester, polyolefin, polyurethane or polyacrylonitrile fibres, leather, plastics, glass, wood, metals, porcelain or painted surfaces. Construction materials, such as concrete, stone, brick and tiles, can also advantageously be treated with the products according to the invention.

The solutions of copolymers according to the invention are mainly applied diluted in an aqueous medium or in a mixture of water and solvents according to known techniques, for example by coating, impregnation, immersion, spraying, brushing, padding or film coating.

With respect to paper, the products according to the invention can be applied in aqueous solution, either superficially on the already completed substrate (preferably in the proportion of 0.05 to 0.2% of fluorine with respect to the weight of paper) or in the body of the material, that is to say in the paper pulp (preferably in the proportion of 0.2 to 0.4% of fluorine with respect to the weight of pulp).

The substrates thus treated exhibit good oleophobic and hydrophobic properties after simple drying at room temperature or at high temperature, optionally followed by a heat treatment which can range, depending on the nature of the substrate, up to 200° C.

In order to obtain good attachment of the copolymers according to the invention to the substrates on which they are applied and, in addition, in order to confer a specific effect, it is sometimes advantageous to combine them with certain adjuvants, polymers, thermocondensable products and catalysts capable of promoting their crosslinking with the substrate. Mention may be made, as such, of urea-formaldehyde or melamine-formaldehyde condensates or precondensates, epoxy derivatives, such as diglycidylglycerol, polyamine-epichlorohydrin resins, glyoxal and its derivatives, polyvinyl alcohols and cationic, oxidized and amphoteric starches.

It may also be advantageous to combine the copolymers according to the invention with one or more non ionic and/or cationic surfactants in order to improve the wetting of the substrate. The weight of this or these surfactants with respect to the total weight of copolymer may change from 0 to 100%.

The surfactants may be added in the organic solution during the copolymerisation reaction. They may also be added at the time of the application of the copolymers according to the invention.

The following tests were used to evaluate the performance of the substrates treated according to the invention:

Greaseproofness Test or "Kit Value"

This test, described in Tappi, vol. 50, No. 10, pages 152A and 153A, RC 338 and UM 511 standard, makes it possible to measure the greaseproofness of substrates with mixtures of castor oil, of toluene and of heptane. These mixtures contain variable amounts of these three products:

| Kit Number (Kit Value) | Volume of castor oil | Volume of toluene | Volume of heptane |
| --- | --- | --- | --- |
| 1 | 200 | 0 | 0 |
| 2 | 180 | 10 | 10 |
| 3 | 160 | 20 | 20 |
| 4 | 140 | 30 | 30 |
| 5 | 120 | 40 | 40 |
| 6 | 100 | 50 | 50 |
| 7 | 80 | 60 | 60 |
| 8 | 60 | 70 | 70 |
| 9 | 40 | 80 | 80 |
| 10 | 20 | 90 | 90 |
| 11 | 0 | 100 | 100 |
| 12 | 0 | 90 | 110 |

The test consists in gently depositing drops of these mixtures on the treated paper. The drops are left on the paper for 15 seconds, the appearance of the paper or cardboard is then carefully observed and the wetting or the penetration revealed by a browning of the surface is recorded. The number corresponding to the mixture containing the highest percentage of heptane which does not penetrate or does not wet the paper is the "kit value" of the paper and is regarded the degree of oleophobicity of the treated paper. The higher the "kit value", the better the oleophobicity of the paper.

Cobb Test

The Cobb test [NF EN 20535-ISO 535 (1994)] consists in measuring the weight (in g) of water absorbed during one minute by a square meter of paper supporting a water height of one centimeter.

Test of Resistance to Dry Animal Food 200 g of dry dogfood, of the trademark Yam's (Eukanuba Puppy grade), are deposited on a 100 cm² surface area of the treated paper in a controlled-environment oven at 60° C. and 65% relative-humidity.

The assembly is placed on an untreated absorbent paper (filter paper type) with the same surface area. After this, a 3.5 kg weight is placed over the entire assembly, which is left in the oven for 3 days.

The diffusion of the fats is evaluated by measuring the total surface area of the stains which have appeared on the absorbent paper. It is considered that the barrier to the fats is effective when the stained surface area is less than 10% of the total surface area of the absorbent paper.

EXAMPLES

The following examples illustrate the invention without limiting it. The parts shown are by weight, except when otherwise indicated.

Example 1

90 parts of NMP, 10 parts of acetone, 16 parts of dimethylaminoethyl methacrylate, 10 parts of vinyl acetate, 81.4 parts of a mixture of fluorinated acrylates of formula:

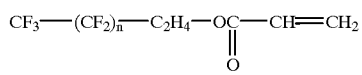

where n is equal to 5, 7, 9, 11 and 13, in the mean and respective ratios by weight of 1/63/25/9/3, and 0.8 part of 4,4'-azobis(4-cyanopentanoic acid) are charged to a 500 parts by volume reactor equipped with a stirrer, a thermometer, a reflux condenser, a dropping funnel, a nitrogen inlet and a heating device.

The mixture is heated at 85° C. under a nitrogen atmosphere for 6 hours and then an aqueous solution containing 200 parts of water, 8 parts of acetic acid and 2.5 parts of 35% by weight hydrogen peroxide is run in dropwise at 75° C.

The reaction mixture is held at 75° C. for two hours while stripping with nitrogen and is then cooled to room temperature. 390 parts of a clear amber solution (S1) are thus obtained, which solution has a solids content of 25%. This solution does not exhibit a flash point between 0 and 100° C. according to ASTM standard D3828.

Example 2

The procedure is as in Example 1 but with acetone being omitted and with the amount of vinyl acetate being increased to 20 parts. After polymerization, a solution comprising 200 parts of water, 8 parts of acetic acid and 2.5 parts of 35% by weight hydrogen peroxide is added dropwise at 75° C. The reaction mixture is held at 78° C. for one hour and is then stripped with nitrogen at the same temperature for one hour.

390 parts of an opalescent solution (S2) are thus obtained, which solution has a solids content of 25.7%. This solution does not exhibit a flash point between 0 and 100° C.

Example 3

The procedure is as in Example 1 with 10 parts of 35% hydrogen peroxide instead of 2.5 parts. 395 parts of a clear yellow solution (S3) are obtained, which solution has a solids content of 24.7%. This solution does not exhibit a flash point between 0 and 100° C.

Example 4

The solutions (S1), (S2) and (S3), a fluorinated acrylic copolymer solution with a solids content of 25%, such as described in Example 4 of Patent EP 542,598 (solution S4), and a cationic starch (Hi Cat SP 050 from the Company Roquette) are used.

The size press baths described in the table below are prepared with these various constituents.

| Constituents of the bath (g/l) | Number of the bath | | | |
|---|---|---|---|---|
| | 1 | 2 | 3 | 4 |
| Solution S1 | 13.5 | | | |
| Solution S2 | | 13.5 | | |
| Solution S3 | | | 13.5 | |
| Solution S4 | | | | 13.5 |
| Starch | 25 | 25 | 25 | 25 |
| Water | 961.5 | 961.5 | 961.5 | 961.5 |
| TOTAL | 1000 | 1000 | 1000 | 1000 |

The pH of the baths is adjusted to 6. The various compositions are applied in a size press on a 70 g/m² paper composed of unsized bleached pulp. The degree of removal is of the order of 110%. After drying for two minutes at 110° C., the paper thus treated is stored for 3 days at room temperature and then subjected to the various tests.

The results obtained are combined in the following table:

| Tests | Paper treated with bath No. | | | | Untreated paper |
|---|---|---|---|---|---|
| | 1 | 2 | 3 | 4 | |
| Kit value | 12 | 12 | 12 | 8 | 0 |
| Cobb (g/m²) | 18 | 19 | 19 | 22 | >100 |
| Test of dry animal food (stained surface area in %) | 0 | 0 | 0 | 100 | 100 |

Examination of the table shows that, at a comparable level of fluorine, paper treated with the fluorinated products according to the invention constitutes a markedly improved barrier to the migration of the fats contained in dry petfood.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Cationic fluorinated copolymers comprising resulting from copolymerization of:

(a) 50 to 92% by weight, of at least one polyfluorinated monomer of formula:

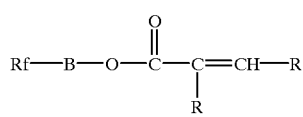

(I)

in which Rf represents a straight- or branched-chain perfluorinated radical containing 2 to 20 carbon atoms, B represents a bivalent chain sequence which is bonded to O via a carbon atom and which optionally contains at least one oxygen, sulphur and/or nitrogen atom, one of the R symbols represents a hydrogen atom and the other a hydrogen atom or an alkyl radical containing 1 to 4 carbon atoms;

(b) 1 to 25% by weight of at least one monomer of formula:

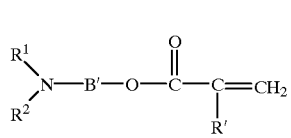

(II)

in which B' represents a linear or branched alkylene radical containing 1 to 4 carbon atoms, R' represents a hydrogen atom or an alkyl radical containing 1 to 4 carbon atoms, the R¹ and R² symbols, which are identical or different, each represent a hydrogen atom, a linear or branched alkyl radical containing 1 to 18 carbon atoms or a hydroxyethyl or benzyl radical, or R¹ and R², together with the nitrogen atom to which they are bonded, form a morpholino, piperidino or 1-pyrrolidinyl radical, (c) 1 to 25% by weight of a vinyl derivative of formula:

(III)

in which R" can be an alkyl carboxylate or alkyl ether group containing from 1 to 18 carbon atoms;

(d) 0 to 10% by weight of any monomer other than the monomers of formulae I, II and III, the copolymerization being carried out in solution in a water-miscible organic solvent or mixture of water-miscible organic solvents and being followed by a stage of dilution with an aqueous solution of an inorganic or organic acid, the stage is carried out in the presence of hydrogen peroxide or is followed by treatment with an aqueous hydrogen peroxide solution.

2. Copolymers according to claim 1, wherein the copolymerization is of 70 to 90% by weight of polyfluorinated monomers(s) of formula I, 8 to 18% by weight of monomer(s) of formula II, 2 to 10% by weight of monomer(s) of formula III and from 0 to 8% of at least one other momomer.

3. Copolymers according to claim 1, wherein use is made of:

(a) at least one polyfluorinated monomer of formula:

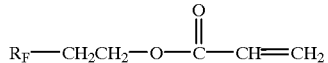

in which $R_F$ is a perfluoroalkyl radical containing 4 to 16 carbon atoms;

(b) dimethylaminoethyl methacrylate or N-tert-butylaminoethyl methacrylate as monomer of formula II; and (c) vinyl acetate as monomer of formula III.

4. Copolymers according to claim 1, wherein the amount of hydrogen peroxide is between 0.1 to 10% with respect to the total weight of the monomers.

5. Copolymers according to claim 1, wherein the dilution stage and/or the final treatment stage is carried out at a temperature of between 25 and 100° C.

6. Copolymers according to claim 1, wherein the copolymerization solvent is N-methyl-2-pyrrolidone or a mixture of the latter with acetone.

7. Copolymers according to claim 1, wherein the acid used is acetic acid.

8. Method for the olephobic and hydrophobic treatment of solid substrates, comprising treating a solid substrate with the copolymer according to claim 1.

9. Method according to claim 8, wherein at the surface of a paper treatment is in the proportion of 0.5 to 0.2% of fluorine with respect to the weight of the paper.

10. Method according to claim 8, wherein the body of a paper pulp treatment is in the proportion of 0.2 to 0.4% of fluorine with respect to the weight of pulp.

11. Solid substrate comprising a fluorinated copolymer according claim 1.

12. Solid substrate according to claim 11 characterized in that it is paper of cardboard.

13. Copolymers according to claim 1, wherein the perfluorinated radical contains 4 to 16 carbon atoms.

14. Copolymers according to claim 4, wherein the amount of hydrogen peroxide is between 0.3 and 3%.

15. Copolymers according to claim 5, wherein the temperature between 70 and 85° C.

16. Method according to claim 8, wherein the substrate is paper or cardboard.

* * * * *